United States Patent [19]

Dennis et al.

[11] 4,355,378

[45] Oct. 19, 1982

[54] LOGGING SYSTEM DEPTH RECORDER

[75] Inventors: Charles L. Dennis, Dallas; John W. Harrell, Duncanville, both of Tex.

[73] Assignee: Mobil Oil Corporation, New York, N.Y.

[21] Appl. No.: 212,063

[22] Filed: Dec. 2, 1980

[51] Int. Cl.³ .............................................. G01V 1/40
[52] U.S. Cl. ..................................... 367/33; 367/911; 346/33 WL; 73/151.5
[58] Field of Search ................. 367/33, 911; 181/102; 364/422; 346/33 WL; 73/151.5

[56] References Cited

U.S. PATENT DOCUMENTS

| | | | |
|---|---|---|---|
| 2,842,852 | 7/1958 | Tangery | 367/33 |
| 3,088,540 | 5/1963 | Kahesh | 367/33 |
| 3,490,150 | 1/1970 | Whitfill | 367/33 |
| 3,824,533 | 7/1974 | Adamson | 367/33 |
| 3,979,714 | 9/1976 | Zemanek | 367/33 |
| 3,986,163 | 10/1976 | Elliott | 367/33 |
| 4,110,688 | 8/1978 | Bailey | 73/151.5 |
| 4,307,395 | 12/1981 | Standish | 346/33 WL |

FOREIGN PATENT DOCUMENTS 546700 10/1975 U.S.S.R. ............................. 73/151.5

Primary Examiner—Nelson Moskowitz
Attorney, Agent, or Firm—Charles A. Huggett; Michael G. Gilman; George W. Hager

[57] ABSTRACT

A logging tool recording system counts and converts depth pulses into a digital coded format. Such digital coded format is converted to a serial digital word for recording on an analog recorder. During playback the digital serial word is converted back into a digital coded format for reproduction by means of a visual digital display.

5 Claims, 6 Drawing Figures

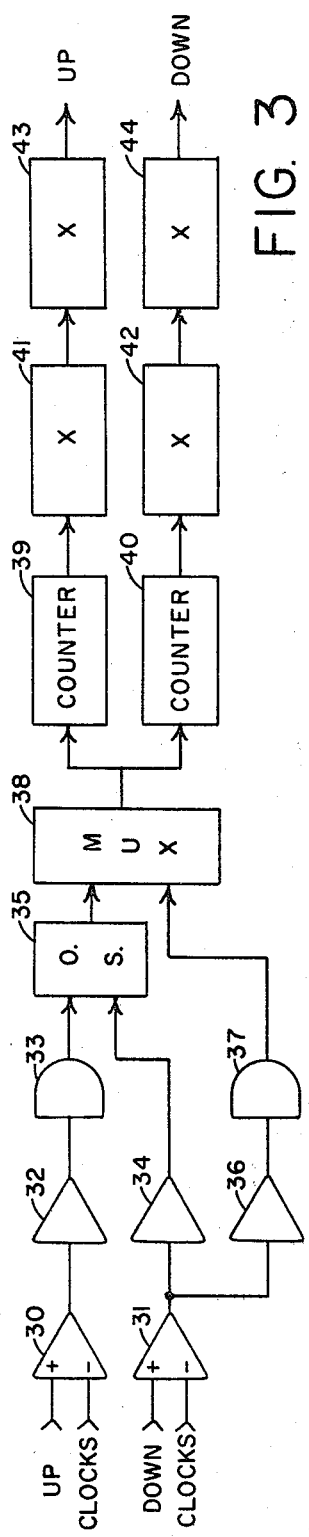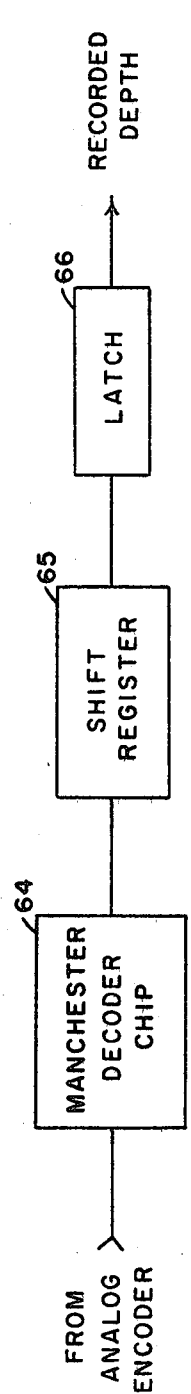

LOGGING SYSTEM DEPTH RECORDER

BACKGROUND OF THE INVENTION

This invention relates to a recording system for use with an acoustic logging tool.

In petroleum exploration, well logging techniques are used to determine the character of subsurface formations penetrated by a borehole. One technique of logging these characteristics employs a logging tool including a transmitter of acoustic pulses and a receiver or receivers, for detecting these acoustic pulses after they have traversed the subsurface formations adjacent the tool. By measuring the travel time of an acoustic pulse from the transmitter through the formation to the receiver, an indication of the velocity of the acoustic pulse through the subsurface formation is obtained and this acoustic velocity is an indication of the character of the subsurface formation. By recording the acoustic velocity in correlation with depth of borehole as the tool moves through the borehole, there is obtained a log of the velocity characteristics of the subsurface formations as a function of depth. Such logs are quite useful, particularly in the exploration for oil-bearing subsurface strata.

In U.S. Pat. No. 3,302,166, to Joseph Zemanek, Jr., there is disclosed an acoustic velocity logging system wherein a downhole tool comprises a plurality of transducers including a transmitter and multiple receivers. The receivers are spaced at different distances from the transmitter such that an acoustic pulse from the transmitter arrives at the receivers by way of different travel paths through the formation surrounding the borehole. Upon generation of an acoustic pulse by the transmitter, a transmitter trigger pulse is transmitted uphole by means of a conductor in the logging cable. The signals produced by the receivers in response to the arrival of the acoustic pulse at the receivers are also transmitted uphole by way of conductors within the logging cable. The logging system is provided with downhole gating circuits which permit the first acoustic pulse to be detected and sent uphole by a first receiver, the second acoustic pulse to be detected and sent uphole by a second receiver, the third acoustic pulse to be detected and sent uphole by a third receiver, and the fourth acoustic pulse to be detected and sent uphole by a fourth receiver. The cycle is then repeated with successive acoustic pulses being detected and transmitted uphole by successive ones of the receivers. The time interval between the generation of each acoustic pulse and the detection of that pulse at a particular receiver is recorded. These time intervals are combined to provide an indication of the acoustic velocity of formations adjacent the logging tool. In such system, the influence of variations on the acoustic velocity measurement caused by the borehole medium as the acoustic pulses travel to and from the borehole tool is eliminated so that the measurements are dependent solely upon the character of the subsurface formations surrounding the borehole.

SUMMARY OF THE INVENTION

The present invention is directed to a new system by which depth signals from a borehole logging system may be recorded and displayed.

The logging system employs a logging tool suspended in a borehole by means of a logging cable. Depth pulses are produced in response to movement of the logging tool through the borehole. The depth pulses are counted and converted into a digital coded format. Such digital coded format is recorded into a digital serial word signal for recording on an analog recorder during logging operations. Such recording is preferably on an audio recording channel of a video cassette recorder along with other logging information provided by the logging tool during logging operations.

During playback, the recorded digital serial word signal is converted back into said digital coded format for reproduction by means of a visual digital display.

BRIEF DESCRIPTION OF THE DRAWINGS

FIG. 2 is a block diagram of the recording system of the present invention.

FIGS. 3-6 are electrical schematics of portions of the block diagram of FIG. 2.

DESCRIPTION OF THE PREFERRED EMBODIMENT

Figure 1:
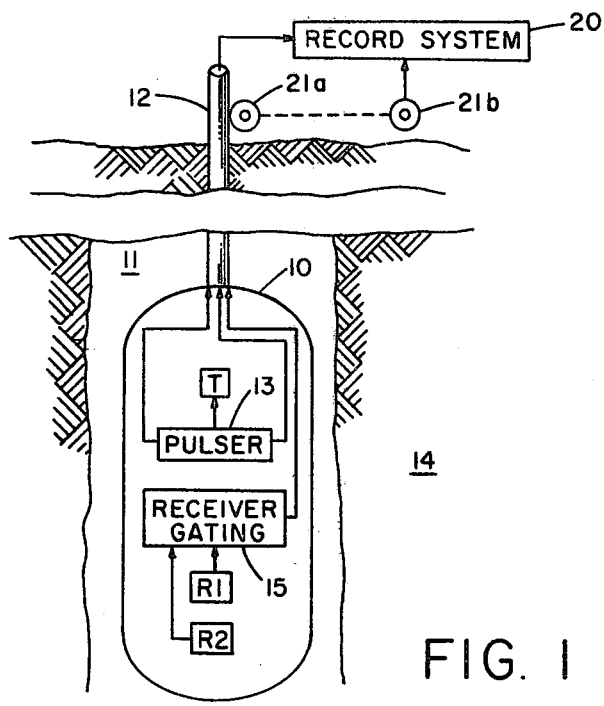
FIG. 1 illustrates a borehole logging tool with which the recording system of the present invention may be utilized.
Figure 4:
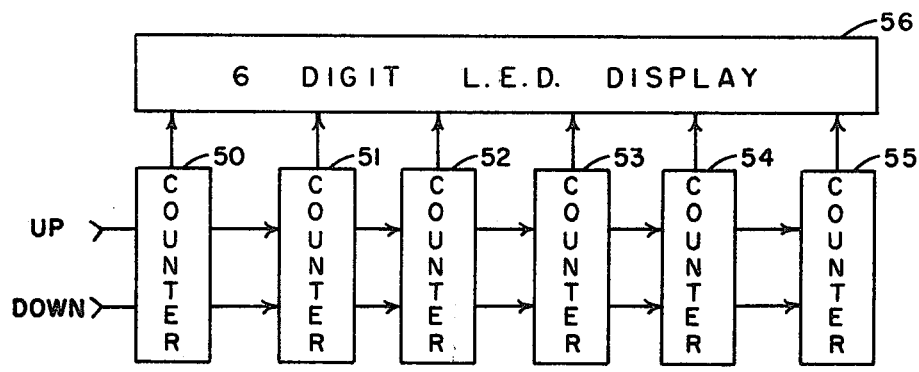

Referring to FIG. 1, there is shown a borehole logging tool 10 suspended within the borehole 11 by means of logging cable 12. Tool 10 includes a transmitter T and two receivers R1 and R2. A pulser circuit 13 energizes transmitter T to transmit high-frequency acoustic pulses into the surrounding earth formation 14. For each acoustic cycle, the pulser 13 sends a transmitter trigger pulse uphole through the cable 12. These acoustic pulses are detected by receivers R1 and R2. During the first acoustic cycle, the receiver gating circuit 15 sends the detected signal from receiver R1 uphole by means of cable 12. During the next acoustic cycle, the receiver gating circuit 15 sends the detected signal from receiver R1 uphole by means of cable 12. During the next acoustic cycle, the receiver gating circuit 15 sends the detected signal from receiver R2 uphole by means of cable 12. These cycles are repeated with successive acoustic pulses being detected by the two receivers and the receiver outputs being selectively gated for sending the detected pulses uphole. The receiver gating circuit 15 also sends a receiver select signal uphole by way of cable 12, indicating which receiver output is being gated at any given time. These transmitter trigger pulses, receiver signals, and receiver select signals are recorded by the recording system 20 as a function of the depth of the tool within the borehole. Driven by the logging cable 12 is a depth converter including a sheave 21a and a shaft encoder 21b that converts the mechanical rotation of the sheave to depth pulses. These depth pulses are recorded by the recording system 20 along with the transmitter trigger pulses, receiver signals, and receiver select signals. For a more detailed description and operation of such a borehole logging tool, reference may be made to U.S. Pat. No. 3,302,166 to Joseph Zemanek, Jr.

It is a specific feature of the present invention to provide a new and improved depth recorder for use with such a borehole logging tool as described in the aforementioned U.S. Pat. No. 3,302,166. Referring now to FIG. 2, there is illustrated the depth recorder of the present invention. The shaft encoder 21b is a shaft-driven device that interrupts a light beam with an etched glass wheel, such that the light incident on a photocell becomes a function of the angular position of the shaft. As the shaft turns, the photo cell/electronics produce pulses that are used to drive the depth counter and display. Since the shaft of the encoder is mechanically coupled to the logging truck cable depth sheave, the encoder output becomes an indication of depth. The encoder can be any 2 channel (up-down) unit, any rate (e.g., 120, 200, 256 PPF) single-ended or differential, clock and direction line or dual clock line, bi-phase encoded or single phase. The variations in encoders can be accommodated by switch selection of mode and rate.

During recording the interface 22 reformats the encoder signals and delivers 10 pulses per foot up and down clock lines by way of multiplier 27 to a six decimal digit counter/display 23. The encoder 24 converts the six digits of depth to a digital serial word. This serial word is recorded on an audio channel of an analog recorder 25. During playback, the decoder 26 reconstructs the serial depth words and applies the results to the six digit counter/display 23. The preferred embodiment of each of the units 22–26 will now be described in detail.

INTERFACE UNIT 22 (FIG. 3)

No industry standard has been established for encoder output formats, rates or polarities. The interface 22 therefore, functions to convert any of the various encoder inputs to a common format suitable for driving the counter/display 23. It reformats any of the standard types of encoder outputs and delivers 10 pulses per foot on up and down clock lines to the counter/display 23.

Referring now to FIG. 3, the line receivers 30 and 31 perform differential or single ended to single ended conversion of incoming encoder data. Single ended input can be applied to either input (+ or −) of the differential pair. The logic elements 32–34 and the one-shot multi-vibrator 35 comprise the biphase detector for use with the Schlumberger encoder output format for example. The logic elements 36 and 37 converts the Dresser-Atlas clock-line-plus-direction line encoder format, for example, to a dual clock line format. Other encoder formats may also be decoded as desired. The multiplexer 38 selects the desired format and applies it to the counters 39 and 40 and the two rate multipliers 41 and 42. These counters and multipliers provide a universal counter string, delivering 10 pulses per foot, which is the tenths digit requirement for the depth counter display. The one shot multi-vibrator 43 and 44 provide one microsecond low true pulses for the depth display counter string. The down clock counter-rate multiplier string is identical to the up clock line.

DEPTH COUNTER/DISPLAY UNIT 23 (FIG. 4)

The depth counter/display unit 23 provides a six digit depth display with one tenth foot resolution. Up and down clock lines derived from the interface unit 22 increment or decrement the up/down decade counters 50–55. The six digit L.E.D. readout 56 is driven directly by the decade counters.

ENCODER UNIT 24 and DECODER UNIT 26

During recording the encoder 24 converts the six digits of depth to a digital serial word for recording on the audio channel of the analog recorder 25. During playback, the decoder 26 reconstructs the serial depth word for display by the six digit L.E.D. display 56. This encoding and decoding is carried out in the preferred embodiment by means of a Harris #HD-1553 Manchester Encoder-Decoder Chip. This large scale integrated chip contains two independent circuits, a Manchester Encoder chip and a Manchester Decoder chip, utilized as encoder 24 and decoder 26 respectively.

Figure 5:
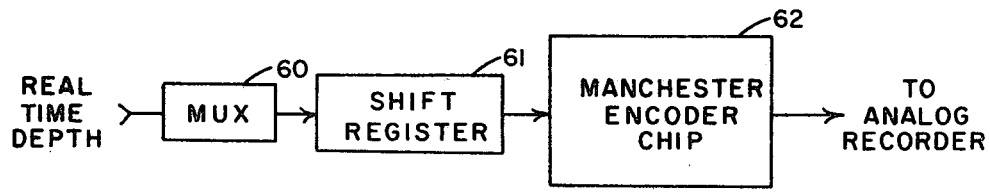

Referring now to FIG. 5, the encoder 24 comprises multiplexer 60, shift register 61 and Manchester Encoder Chip 62. Multiplexer 60 selects either the most significant 3 digits or the least significant 3 digits of depth information for application to the Manchester Encoder Chip 62 by way of shift register 61. The Manchester Encoder Chip 24 in conjunction with shift register 61 converts the six digits of depth to a digital serial word for recording by the analog recorder 25.

Referring now to FIG. 6, the decoder 26 comprises the Manchester Decoder Chip 64, the shift register 65 and the latch 66. The Manchester chip 64 in conjunction with the shift register 65 converts the two serial words from the analog recorder representing the depth data back to parallel format. These two words are latched in the latch unit 66.

Referring again to FIG. 2, the display select 67 selects either of these two words from latch 66 of decoder 26 during playback or real time depth information from the interface 22 for application by way of multiplexer 27 to the depth display portion of counter/display 23. Display select 67 monitors the valid data line from latch 66 and automatically selects either the recorded depth information from decoder 26 or the real time depth information from the interface 22. This permits read after write capability when depth information is being recorded and also permits normal operation if no recording is desired.

It is to be understood that the foregoing described circuit elements are merely representative of one embodiment of the present invention. Various other types and values of circuit components may be utilized. In accordance with the preferred embodiment, the following Table sets forth specific types and values of the circuit elements.

| Reference Designation | Description |
| --- | --- |
| Encoder 21 | Shaft-driven (Baldwin Electronics) |
| Analog Recorder 25 | TEAC Video Cassette Recorder |
| Live Receivers 30 & 31 | 9615 (FAIRCHILD) |
| Logic Elements 32, 33 & 36 | LS04 (TEXAS INSTRUMENTS) |
| Multivibrator 35, 43 & 44 | LS123 (TEXAS INSTRUMENTS) |
| Logic elements 34 & 37 | LS00 (TEXAS INSTRUMENTS) |
| Multiplexer 38 | LS153 (TEXAS INSTRUMENTS) |
| Counters 39 & 40 | LS107 (TEXAS INSTRUMENTS) |
| Multipliers 41 & 42 | 7479 (TEXAS INSTRUMENTS) |
| Counters 50–55 | 74192 (TEXAS INSTRUMENTS) |
| Counter/Display 23 | Hewlett-Packard L.E.D. |
| Encoder & Decoder Chips 60 & 64 | HD-1553 Manchester (Harris Corporation) |
| Shift Register 61 | LS165 (TEXAS INSTRUMENTS) |
| Multiplexer 27 & 62 | LS157 (TEXAS INSTRUMENTS) |
| Shift Register 65 | 74C 164 (TEXAS INSTRUMENTS) |
| Latch 66 | 74C 174 (TEXAS INSTRUMENTS) |
| Display Select 67 | 4098 (RCA) & 2N 3569 (MOTOROLA) |

We claim:
1. In a well logging system having a logging tool suspended in a borehole by means of a logging cable and an encoder for providing depth pulses in response to movement of the logging tool through the borehole, a system for converting depth pulses encoded in select formats into a common format suitable for use in the display of the depth of the logging tool in the borehole on a digital display device, comprising:

(a) a first detector to which said depth pulses are applied for converting any bi-phase encoded depth information into a first dual clock line formatted signal,
(b) a second detector to which said depth pulses are applied for converting any clock-line-plus-direction line encoded depth information into a second dual clock line formatted signal,
(c) a selector to which the outputs of said first and second detectors are applied for providing a selected output of one of said first and second dual clock line formatted signals,
(d) a first counter for counting up depth pulses in the selected output from said selector,
(e) a second counter for counting down depth pulses in the selected output from said selector, and
(f) means for applying said count of up depth pulses and said count of down depth pulses to said digital display device.

2. The system of claim 1 wherein said first and second counters include a multiplier for providing a count output compatible with the digit requirement of said digital display device.

3. The system of claim 2 wherein said multiplier provides a universal count string output of ten pulses per foot of logging depth.

4. The system of claim 2 further including
(a) a first multivibrator for providing low true pulses to the digital display device in response to the up count output of said first counter, and
(b) a second multivibrator for providing low true pulses to the digital display device in response to the down count output of said second counter.

5. The system of claim 1 further including means for applying depth pulses to said first and second detectors which are differential or single-ended to single-ended conversions of the output of said encoder.

* * * * *